United States Patent [19]
Dross et al.

[11] Patent Number: 5,973,861
[45] Date of Patent: Oct. 26, 1999

[54] PANCRATIC SYSTEM

[75] Inventors: Heinrich Dross, Ehringshausen-Daubhausen; Karl-Otto Ott, Greifenstein-Holzhausen, both of Germany

[73] Assignee: Hensoldt AG, Wetzlar, Germany

[21] Appl. No.: 09/037,660

[22] Filed: Mar. 10, 1998

[30] Foreign Application Priority Data

Mar. 12, 1997 [DE] Germany .................. 297 04 462 U

[51] Int. Cl.$^6$ .................................................. G02B 7/02
[52] U.S. Cl. ..................................... 359/819; 359/822
[58] Field of Search .......................................... 359/819

[56] References Cited

U.S. PATENT DOCUMENTS 3,441,339  4/1969  Rederer et al. ...................... 359/822
4,322,150  3/1982  Kamata et al. ......................... 396/79
4,448,496  5/1984  Isobe et al. ............................ 359/705

FOREIGN PATENT DOCUMENTS 492991  8/1970  Switzerland .

Primary Examiner—Scott J. Sugarman
Assistant Examiner—Suzanne Letendre
Attorney, Agent, or Firm—Walter Ottesen

[57] ABSTRACT

The invention is directed to a pancratic system in an optical apparatus having a guide tube wherein at least one lens is moved in the guide tube. At least two guide rails are provided between the lens and the guide tube for guiding the lens. The surfaces of the intermediate spaces between the guide rails are configured so as to be poorly reflective and the space between the guide rails is also configured so as to be poorly reflecting.

13 Claims, 2 Drawing Sheets

PANCRATIC SYSTEM

FIELD OF THE INVENTION

The invention relates to a pancratic system in a telescope having a guide tube. At least one lens is moved in the guide tube.

BACKGROUND OF THE INVENTION

Pancratic systems are utilized wherever a change of the magnification (also of the zoom) is wanted.

Reflections caused by glancing incident light present a special constructive problem because of the high optical performance specifications for optical apparatus. This applies especially to pancratic systems wherein holders are guided and moved in a lubricated bore because reflections are clearly visible in such systems under specific conditions.

U.S. Pat. No. 3,441,339 discloses a photoobjective wherein a lens is fixedly mounted in a lens holder tube. This lens holder tube is guided in an inner tube of the objective tube via three discrete holding bodies. These bodies have a relatively large spacing with respect to each other. In this connection, reference can be made to FIG. 1 of U.S. Pat. No. 3,441,339.

U.S. Pat. Nos. 4,322,150 and 4,448,496 disclose a zoom objective wherein an inner tube body is guided via four pins in another inner tube body having four recesses. Here, reference can be made to FIGS. 2 and 3 of U.S. Pat. No. 4,322,150 and FIGS. 11 and 12 of U.S. Pat. No. 4,448,496.

Swiss Patent 492,991 discloses an objective having a changeable focal length wherein the lens holder has three threaded lugs which are guided in three slots of an inner tube as shown in FIGS. 5 and 6 of this patent.

SUMMARY OF THE INVENTION

In view of the foregoing, it is an object of the invention to provide a pancratic system wherein the reflections caused by glancing incident light are greatly reduced.

The pancratic system of the invention is for a telescope having a guide tube defining an inner wall. The pancratic system includes: a lens unit; at least two guideways arranged between the lens unit and the guide tube; the two guideways and the guide tube conjointly defining intermediate spaces between each two mutually adjacent ones of the guideways; the lens unit being mounted in the guide tube so as to be movable along the guideways; and, the intermediate spaces being defined by the guideways and the inner wall and the guideways and the inner wall conjointly delimiting a surface configured so as to be poorly reflective.

The pancratic system according to the invention is in a telescope having a guide tube. The system of the invention is characterized in that at least two guide rails are provided between the lens and the guide tube to guide the lens. The surfaces of the intermediate spaces between the guide rails are configured so as to be poorly reflective and the space between the guide rails is likewise configured to be poorly reflective. In this way, the reflections in the inner tube and therefore in the optical beam path are reduced. Finally, the guide arrangement of the inner bore is reduced to a low number of guide rails.

It is advantageous that the guide rails are orientated so that they are parallel to the optical axis.

It is further advantageous when a recess is provided between the guide rails without contact being present between the lens and the guide tube. In this way, frictional resistance is reduced.

The reflections present when there is glancing incident light are reduced when the surface of the recess is configured to be rough. A reduction of the reflection-caused disturbances is obtained also when the surface of the recess is radiation absorbent. Both measures can advantageously be utilized together.

It is advantageous when at least three guide rails are provided between the lens and the guide tube in order to provide the smallest possible dimensioning of the rails while at the same time ensuring a reliable guidance.

The spacing between the guide rails is advantageously made to be uniform.

The guide rails can advantageously be provided on the inner surface of the guide tube.

Guide channels can be provided for the guide rails. These guide channels can be provided on the lens, on the inner surface of the guide tube or on the lens holder.

The preferred telescopes for this invention are aiming telescopes.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
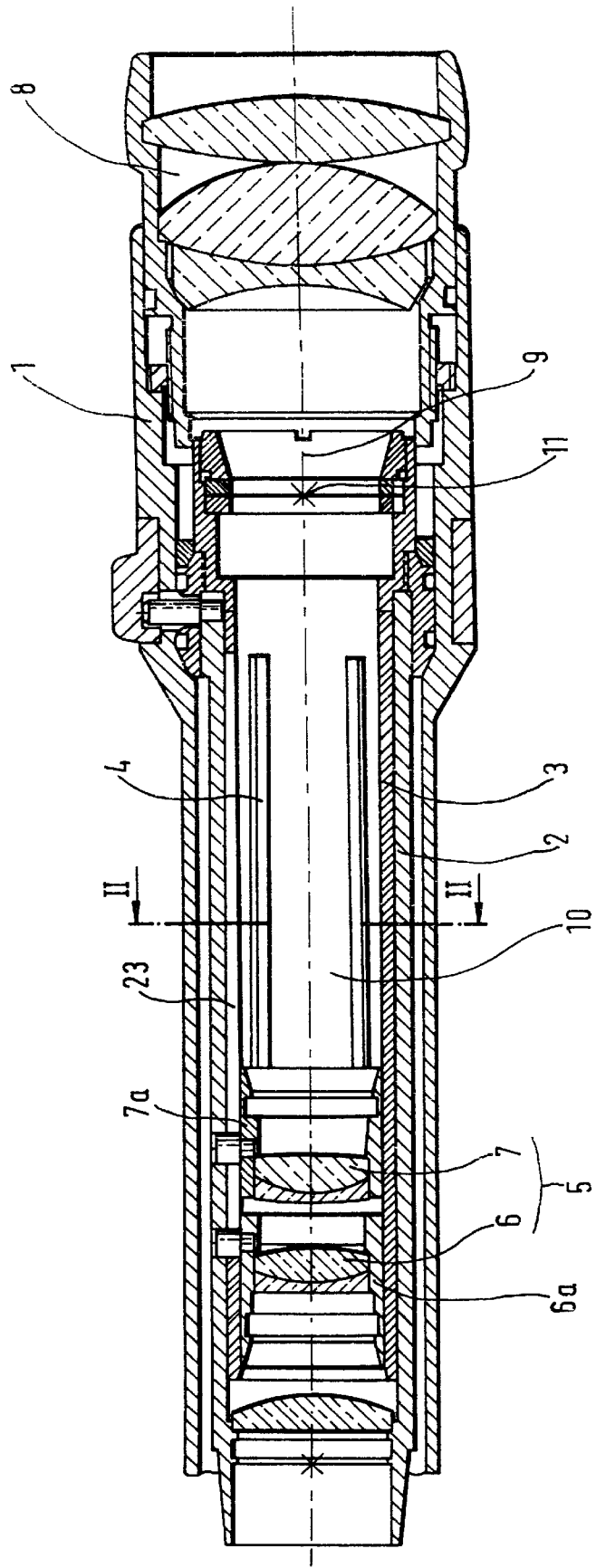
FIG. 1 is a side elevation view, in section, of an aiming telescope incorporating the pancratic system according to the invention.
Figure 2:
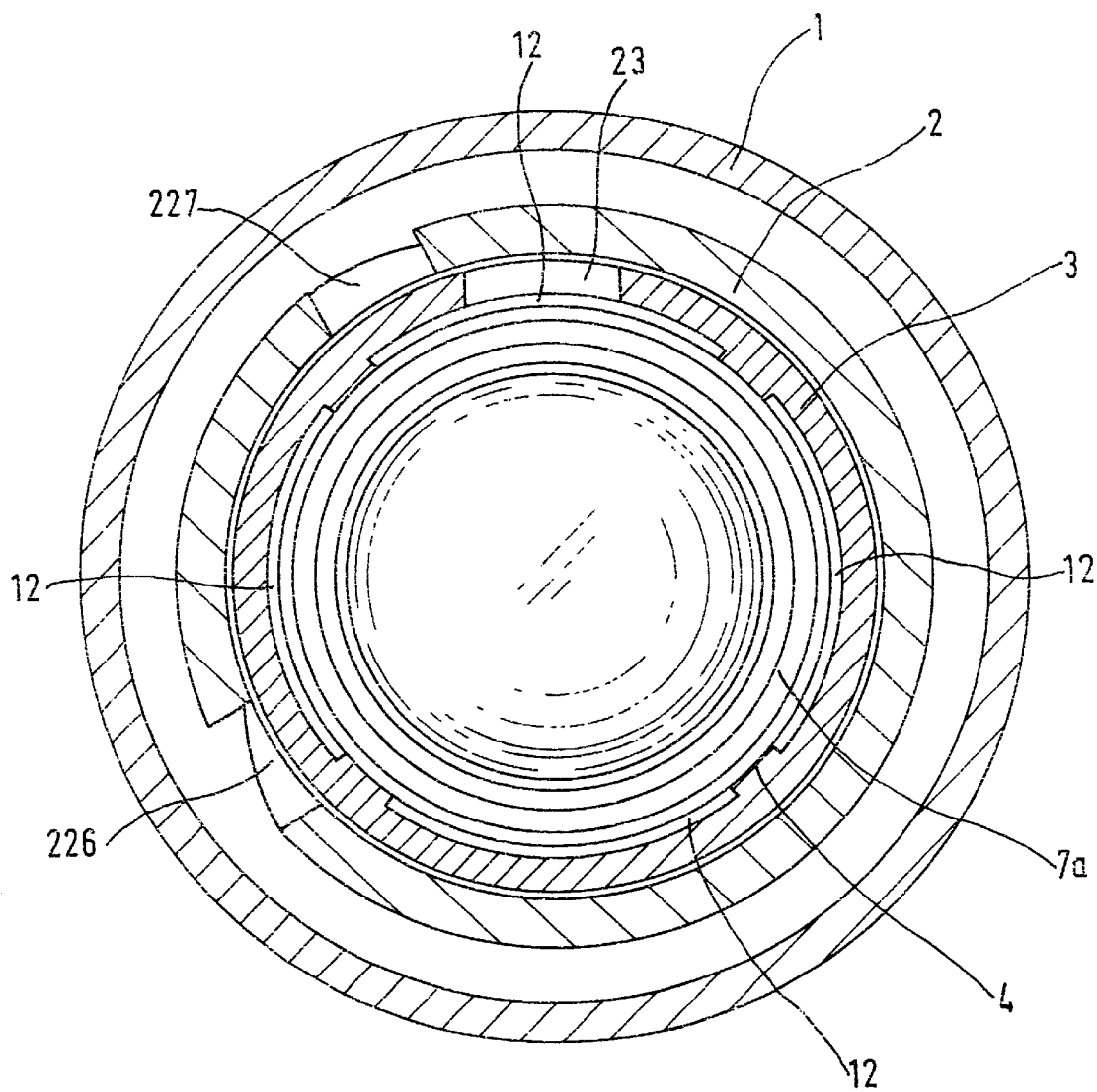
FIG. 2 is a section view through the aiming telescope taken at line I—I of FIG. 1.

The part of the aiming telescope shown in FIGS. 1 and 2 includes a sealed-off tube 1 which encloses the inner tube of the telescope gas tight and/or water tight.

The inner tube 2 is a cam tube and a guide tube 3 is provided therein. The guide tube 3 has four guide rails 4 which are disposed at equal spacings about the circular periphery of the guide tube. Recesses 12 are disposed between two guide rails 4. The width of the guide rail 4 is selected to be as small as possible. This affords the advantage that the guide rails 4 lie in contact engagement at only small surfaces on a lens holder 7a holding lenses 7 of the pancratic system 5 and, in this way, the frictional resistance is as low as possible for the desired stability characteristics. Experiments have shown that the wanted stability characteristics are achieved for a relationship between the inner diameter of the guide tube 3 to the guide rail width of 1:15 especially for aiming telescopes. However, this ratio preferably lies between 1:10 and 1:5. The ratio is about 1:7 for normal aiming telescopes.

The surface of the guide rails 4 is lubricated or coated with a material which greatly reduces friction. Surfaces of the moved lens holders (6a, 7a) of the pancratic system 5 are correspondingly configured to exhibit a low friction.

The pancratic system 5 comprises two lens blocks (6, 7) in respective lens holders (6a, 7a). The system 5 is arranged forward of the ocular 8 and permits a change of the magnification. For this purpose, the lens holders (6a, 7b) have cam followers (26, 27) which run in cam curves (226, 227) of cam tube 2 and in linear guide 23 of the guide tube 3. The lens holders (6a, 7b) are thereby linearly displaced by a rotation of the cam tube 2. The optical axis 9 runs parallel to the guide rails 4.

The inverting system 10 and the sight graticule 11 are arranged on this optical axis 9 (in the second image plane). The objective region of the aiming telescope is not shown in the drawings.

Figure 3:
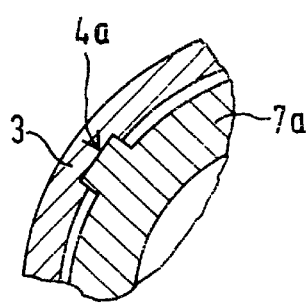
FIG. 3 is a detail view of a guiding arrangement for guiding the lens holders of the pancratic system of the invention; and, FIG. 4 is a detail view of an alternate guiding arrangement for guiding the lens holders of the pancratic system of the invention.
Figure 4:
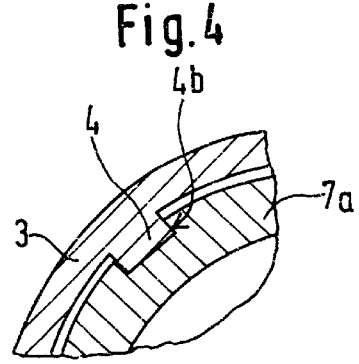

FIGS. 3 and 4 show variations wherein the lens holders (6a, 7a) are guided in the guide tube 3 with guide rails and guide channels (slot and key). Each guide rail 4 and a guide channel 4a conjointly define a guideway. FIG. 3 is a detail view showing how guidance is achieved with guide channel 4a in the guide tube 3 and, in the detail view of FIG. 4, guidance is provided by a running channel 4b in the lens holder 7a and rail 4 on the guide tube 3.

The system according to the invention is suitable for all binoculars and especially for aiming telescopes.

It is understood that the foregoing description is that of the preferred embodiments of the invention and that various changes and modifications may be made thereto without departing from the spirit and scope of the invention as defined in the appended claims.

What is claimed is:

1. A pancratic system comprising:

a telescope having a guide tube defining an inner wall;

a lens unit;

at least two guideways arranged between said lens unit and said guide tube;

said guideways conjointly defining intermediate spaces between each two mutually adjacent ones of said guideways;

said lens unit being mounted in said guide tube so as to be movable along said guideways; and, said intermediate spaces being delimited by said guideways and said inner wall and said guideways and said inner wall conjointly defining a surface configured so that the reflections caused by glancing incident light are reduced.

2. The pancratic system of claim 1, wherein said guide tube defines an optical axis; and, said guideways are parallel to said optical axis.

3. The pancratic system of claim 1, wherein said intermediate spaces are recesses formed so that a clear gap is defined between said inner wall and said lens unit.

4. The pancratic system of claim 3, wherein each of said recesses have a surface and said surface being roughened.

5. The pancratic system of claim 3, wherein each of said recesses have a surface configured so as to be radiation absorbent.

6. The pancratic system of claim 1, further comprising a third guideway between said lens unit and said guide tube.

7. The pancratic system of claim 1, wherein said guideways are spaced equally from each other about the periphery of said inner wall.

8. The pancratic system of claim 1, wherein said two guideways are mounted on said inner wall of said guide tube.

9. The pancratic system of claim 1, wherein said lens unit includes a lens holder and said guideways are formed on said lens holder.

10. The pancratic system of claim 1, wherein running channels are provided for said guideways, respectively.

11. The pancratic system of claim 1, further comprising running channels formed in said inner wall for said guideways, respectively.

12. The pancratic system of claim 1, wherein said lens unit includes a lens holder having channels formed thereon for corresponding ones of said guideways; and, said guideways are formed on said inner wall of said guide tube.

13. The pancratic system of claim 1, wherein said telescope is an aiming telescope.

* * * * *